United States Patent [19]

Cullen et al.

[11] 3,919,717

[45] Nov. 11, 1975

[54] WEAR-RESISTANT SURFACE FOR MAGNETIC HEADS CONSISTING OF DIAMOND PARTICLES

[75] Inventors: Francis M. Cullen; David D. Roshon, Jr., both of Binghamton; Keith A. Snyder, Vestal, all of N.Y.

[73] Assignee: International Business Machines Corporation, Armonk, N.Y.

[22] Filed: July 24, 1974

[21] Appl. No.: 491,411

[52] U.S. Cl. .................................. 360/122; 360/125

[51] Int. Cl.² .................................. G11B 5/22

[58] Field of Search ............ 360/122, 125, 119–121; 204/41–42, 16; 29/603

[56] References Cited

FOREIGN PATENTS OR APPLICATIONS 776,348 6/1957 United Kingdom ................. 360/122

OTHER PUBLICATIONS

IBM Tech. Disc. Bull.: Rhodium Plating of Magnetic Heads, Rogers, V. 12, No. 9, Feb. 1970, p. 1400.

IBM Tech. Disc. Bull.: Wear Coating For a Tape Head, Groben et al., V. 9, No. 9, p. 1085, Feb. 1967.

*Primary Examiner*—Alfred H. Eddleman
*Attorney, Agent, or Firm*—Paul M. Brannen

[57] ABSTRACT

A wear-resistant surface for magnetic heads comprising diamond particles in a matrix of softer material. A preferred composition utilizes electroplated rhodium having a hardness greater than 900 Knoop, and the diamond particles are rounded particles of uniform size having an average diameter of nine microns.

4 Claims, 3 Drawing Figures

WEAR-RESISTANT SURFACE FOR MAGNETIC HEADS CONSISTING OF DIAMOND PARTICLES

FIELD OF THE INVENTION

This invention relates to magnetic recording heads and particularly to an improved wear-resistant surface for such heads.

DESCRIPTION OF THE PRIOR ART

Various types of wear-resistant surfaces for magnetic heads are known in the prior art, for example, chromium plating and flame-sprayed tungsten carbide. However, coatings produced in accordance with the present invention provide a wear resistance many times greater than any previously known.

SUMMARY OF THE INVENTION

It is a principal object of the present invention to provide an improved wear-resistant coating for magnetic recording heads.

Another object of the invention is to provide an improved wear-resistant coating for magnetic heads comprising a composite of diamond particles held in an electroplated metal matrix.

A further object of the invention is to provide a coating of the type described in which the metal employed is rhodium.

Still another object of the invention is to provide a coating of the type described in which the diamond particles are round and uniform in size with an average diameter of nine microns.

Yet another object of the invention is to provide a coating of the type described in which the rhodium metal is electroplated rhodium with a hardness greater than 900 Knoop.

Other objects of the invention and features of novelty and advantages thereof will become apparent from the following detailed description, taken in connection with the accompanying drawings.

In practicing the invention, the head surfaces to be provided with a wear-resistant coating in accordance with the present invention are plated by a "pack" plating process to produce a composite coating comprising a matrix metal of electroplated rhodium, with a hardness greater than 900 Knoop, having dispersed therein diamond particles which are round and have an average diameter of nine microns, in which the density of the diamond particles is such that the projected surface area of the diamond particles, measured normal to the plated surface, shall comprise 60 to 70 percent of the total surface area.

GENERAL DESCRIPTION OF THE DRAWINGS

DETAILED DESCRIPTION OF THE PREFERRED EMBODIMENT

This invention provides a type of coating which has the capability of much greater wear resistance than any previously available. The coating consists of a composite of diamond particles held in an electroplated metal matrix, in particular, one of electroplated rhodium. Previous coatings of this type have been of limited value because they have not resulted in large increases in wear resistance. This has been due to a failure to optimize the parameters of the composite coating. Coatings in accordance with this invention have exhibited wear resistance to abrasion by paper and MICR ink, hundreds of times greater than other hard coatings such as chromium plating and flame-sprayed tungsten carbide. Before describing the optimum coating in detail, the principles involved will be reviewed.

Since abrasive wear is a fairly well understood process, prediction of the relative wear resistance of different materials becomes possible. When a material is subjected to wear by an abrasive medium, hardness is the dominant parameter determining the rate of wear.

Figure 1:
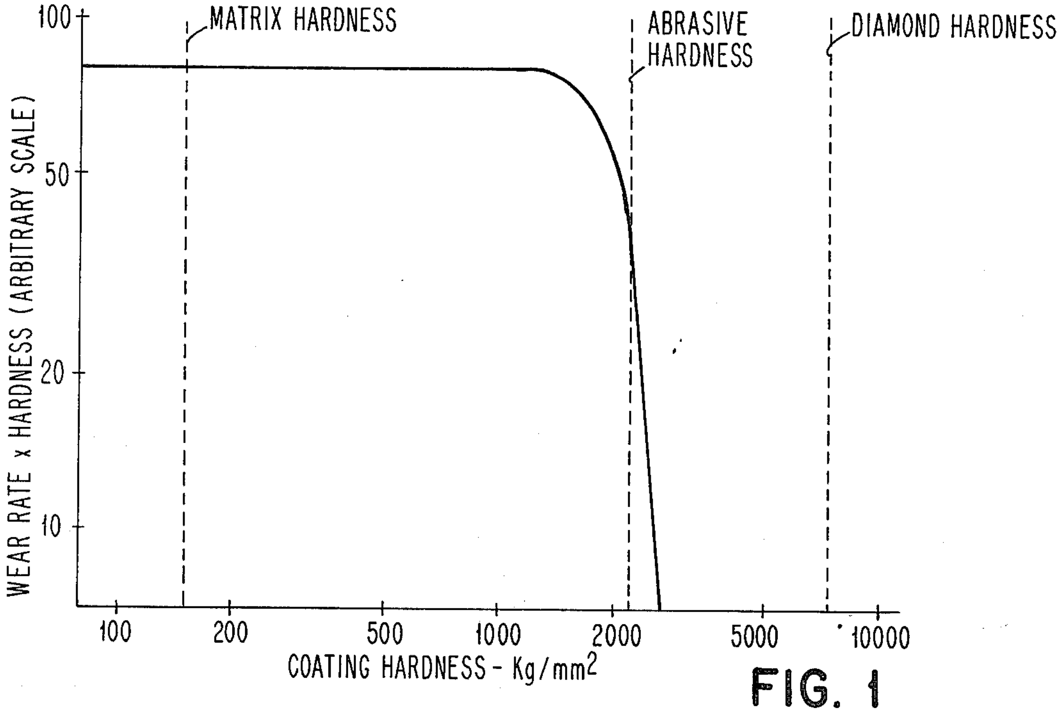
FIG. 1 is a graphic illustration of wear rate multiplied by hardness versus coating hardness.

FIG. 1 shows how the wear rate of a material subjected to abrasion varies with its hardness. Hardness is plotted on the abscissa, while the ordinate is the product of wear rate and hardness. Note the logarithmic scales. As the hardness increases, the product wear rate times hardness remains constant until the hardness of the abrading medium is reached. At this point, the wear rate decreases sharply and becomes very small for hardness values greater than that of the abrading medium.

It is thus apparent that if a magnetic head could be provided with a coating substantially harder than the hardest abrasive in the paper-ink combination, the life would be very long. Studies of wear of read heads had indicated that abrasives harder than tungsten carbide were present, for the flame-sprayed heads suffered severe wear by paper debris. On the other hand, very low wear rates for certain aluminum oxide ceramics have been reported. Hence a hardness at least equal to that of aluminum oxide may be assumed to be required.

Although hardness is the significant property in determining wear resistance, it is not the only property of importance in a wear-resistant coating. Hard materials are often brittle substances, so that thin homogeneous coatings would be very fragile. In addition, mismatch of thermal expansion properties with respect to the substrate can cause coating failure due to thermal stresses.

These difficulties are overcome by employing a cermet material—a composite consisting of small particles of the hard material embedded in a tough metallic matrix. By this means, both hardness and toughness can be imparted to the composite material. Cermet structures can be produced by various means. Powder metallurgical methods and electroplating are two techniques commonly employed in the abrasive tool field. The bond between the hard particles and the matrix may be a metallurgical one or a purely mechanical one.

Figure 2:
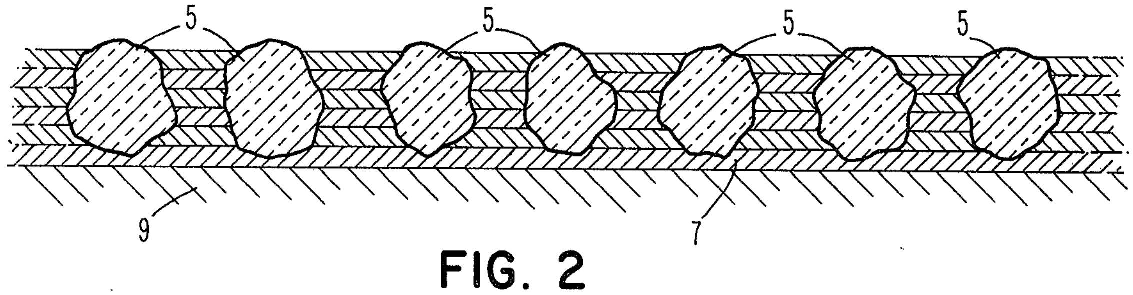
FIG. 2 is a diagrammatic illustration of the relationship of the diamond particles, the metallic matrix and the substrate.

In the case of a cermet, the abrasive wear process becomes much more complex. Not only is the wear of two different materials a factor, but the geometry of the cermet structure also becomes a factor. Consider the single-layer cermet structure depicted in FIG. 2, consisting of diamond particles 5 embedded in a soft metal matrix 7 on a substrate 9 and subjected to abrasion by material of intermediate hardness, such as aluminum oxide. The rate of wear of the diamond will be close to zero. The metal matrix will wear rapidly at first, but as it becomes worn below the surface of the diamond, the wear rate drops drastically, due to the reduction in pressure. Failure of the coating occurs when the matrix has worn so much that the diamond particles are no longer retained in the matrix. The time to failure is a strong function of the surface diamond density. When the diamond particles are sufficiently close together, the matrix metal becomes virtually inaccessible to wear by the abrasive. Hence the surface diamond density is a very critical parameter.

Figure 3:
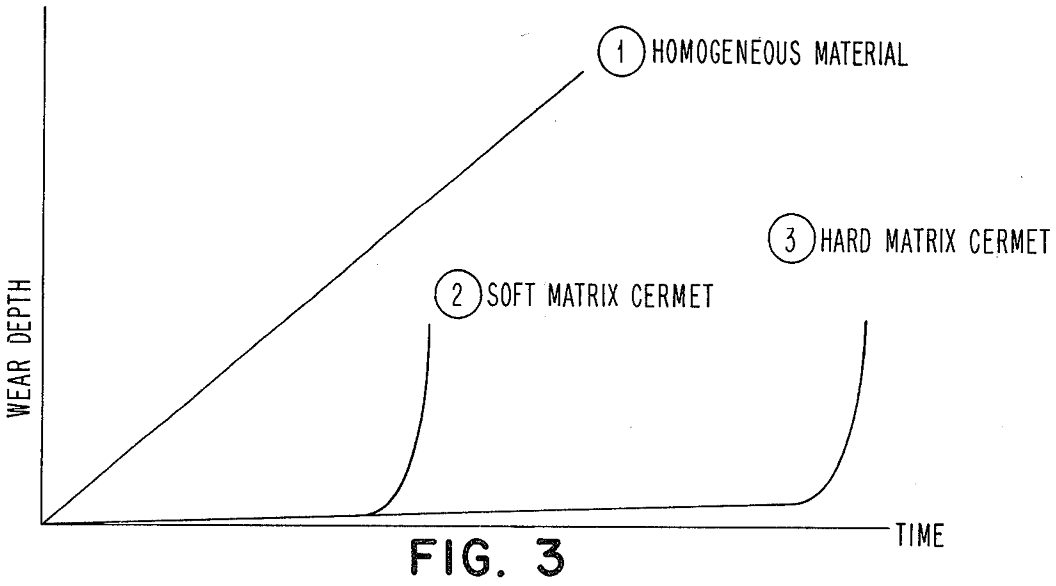
FIG. 3 is a graphic illustration of the relation of wear depth versus time plotted for homogeneous material, a soft matrix cermet, and a hard matrix cermet.

A homogeneous material, subjected to abrasive wear at constant pressure, shows a linearly increasing depth of wear with time, as shown by curve 1 in FIG. 3. The macroscopic wear of a diamond cermet (as defined by the envelope of the diamond particles) is essentially zero, until the matrix metal is eroded away. Curve 2 shows this situation. Since the matrix metal is softer than the abrading medium, its wear life is governed by the horizontal portion of the wear curve of FIG. 1. Hence the time to failure of a cermet coating is directly proportional to the hardness of the matrix metal—all other conditions being equal. Use of a harder matrix results in wear curve 3 in FIG. 3. Note that even with a soft matrix, the time to failure can be very long compared to that required to produce a depth of wear equal to the coating thickness in a hard homogeneous material.

The life of a composite coating is greatly influenced by the size of the hard particles in the matrix, relative to the size of the abrading particles. Larger particles are able to withstand larger forces without being torn from the matrix. Optimum size is also dependent on the nature of the particle-matrix bond, whether metallurgical or mechanical. It has been found that coatings employing a mechanical bond, as is usual with electroplated diamond, require a larger particle size for good wear resistance. The optimum particle size is also affected by the hardness of the matrix metal, since this influences the force with which the particles are held. The parameter of particle size is perhaps the most critical in determining the wear resistance of a composite coating. Lack of optimization of this parameter has been a major cause of failure of past composite coatings to exhibit high wear resistance.

Shape of the hard particles is also an important parameter. Sharp, angular particles are subjected to higher loads, since they act as cutting tools. Particles of rounded shape and uniform size provide the lowest forces and best uniformity of coating. They also produce less damage to the mating surface.

The most commonly used matrix metal for electroplated composite coatings is a relatively soft nickel. Wear tests have shown that such coatings are capable of very high wear resistance, if the other coating parameters are optimized. Nickel, however, is magnetic, so that it is not suitable for most magnetic head applications. To avoid this problem, a matrix plating of tin-nickel alloy has been tried. This is nonmagnetic and also much harder than nickel. Tests of tin-nickel-diamond composite coatings have demonstrated the extremely high wear resistance to be expected with a harder matrix metal. The tests also showed another benefit to be gained from the use of a hard matrix: the coatings become much less sensitive to the presence of small imperfections, so that quality control becomes much less critical. The tin-nickel matrix suffers from the disadvantage that it is quite brittle.

The foregoing work has led to the choice of rhodium for the matrix metal. Rhodium is still harder than tin-nickel, yet not excessively brittle. Rhodium plating can be produced in a crack-free form, in contrast to chromium, which is of similar hardness. The optimized diamond-rhodium coating parameters, for use on magnetic heads, can be described as follows:

Coating Type: Single-layer diamond-rhodium composite.

Coating Thickness: Approximately 10 microns.

Matrix Metal: Electroplated rhodium, hardness greater than 900 Knoop, 100 gram load.

Diamond Particles: Rounded diamond of uniform size, average diameter 9 microns.

Diamond Density: The projected surface area of the diamond particles, measured normal to the plated surface, shall comprise 60 to 70 percent of the total surface area.

Plating Process: The composite coating may be produced by the "pack" plating process as described in an article entitled "Plating with Diamonds," by K. Gillis, in the publication "American Machinist," May 9, 1966.

While the invention has been particularly shown and described with reference to a preferred embodiment thereof, it will be understood by those skilled in the art that various changes in form and details may be made therein without departing from the spirit and scope of the invention.

We claim:

1. A magnetic head comprising a core of ferrous material and a wear-resistant contacting surface constituted by a large plurality of diamond particles in a matrix of softer material, said particles having a size and disposition to comprise a diamond particle density in which the projected surface area of said diamond particles comprises 60 to 70 percent of the total area of said surface.

2. A magnetic head according to claim 1, in which said matrix is rhodium metal.

3. A magnetic head according to claim 1, in which said diamond particles are rounded particles of uniform size having an average diameter of 9 microns.

4. A magnetic head according to claim 2, in which the rhodium metal is electroplated rhodium with a hardness greater than 900 Knoop.

* * * * *